(12) United States Patent
Wang et al.

(10) Patent No.: US 11,667,285 B2
(45) Date of Patent: Jun. 6, 2023

(54) VEHICLE CONTROL METHOD AND APPARATUS, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Ruisuo Wang, Beijing (CN); Xiaobo Ma, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 177 days.

(21) Appl. No.: 17/234,644

(22) Filed: Apr. 19, 2021

(65) Prior Publication Data

US 2022/0097697 A1  Mar. 31, 2022

(30) Foreign Application Priority Data

Sep. 25, 2020 (CN) .......................... 202011027395.6

(51) Int. Cl.
*B60W 30/14* (2006.01)

(52) U.S. Cl.
CPC ......... *B60W 30/14* (2013.01); *B60W 2520/10* (2013.01); *B60W 2554/4041* (2020.02); *B60W 2554/802* (2020.02); *B60W 2555/20* (2020.02)

(58) Field of Classification Search
None
See application file for complete search history.

(56) References Cited

U.S. PATENT DOCUMENTS 6,309,117 B1   10/2001  Bunce
6,789,637 B1    9/2004  Winner
(Continued)

FOREIGN PATENT DOCUMENTS

CN      1380859 A     11/2002
CN    102442308 A      5/2012
(Continued)

OTHER PUBLICATIONS

Notice of Allowance of the priority application CN202011027395.6.
(Continued)

*Primary Examiner* — David P. Merlino
(74) *Attorney, Agent, or Firm* — J.C. Patents

(57) ABSTRACT

The present disclosure relates to adaptive cruise control in the field of automatic driving, and discloses a vehicle control method, an apparatus, an electronic device and a storage medium. A specific implementation is: firstly, determining a target travelling scenario according to real-time monitoring data upon fulfilment of a preset update condition; then, determining a target time headway according to the target travelling scenario, where the target time headway is used to dynamically adjust a relative motion state between an host vehicle and a surrounding vehicle; and finally, controlling a vehicle according to the target time headway. It solves the problem of the prior art in overemphasizing the state of the vehicle ahead for automatic driving control while overlooking the perception of the driver or passenger of the host vehicle in the travelling scenario can prompt the driver to manually intervene, compromising the experience of the automatic driving.

16 Claims, 5 Drawing Sheets

(56) References Cited

U.S. PATENT DOCUMENTS

| | | | |
|---|---|---|---|
| 2001/0014845 A1 | 8/2001 | Minowa | |
| 2008/0036576 A1 | 2/2008 | Stein | |
| 2009/0157276 A1 | 6/2009 | Kade | |
| 2009/0271084 A1* | 10/2009 | Taguchi | B60W 30/16 701/96 |
| 2013/0013163 A1* | 1/2013 | Hong | B60W 30/16 701/96 |
| 2013/0211689 A1 | 8/2013 | Mizutani | |
| 2015/0025706 A1 | 1/2015 | Roth | |
| 2015/0146917 A1 | 5/2015 | Bernal | |
| 2016/0214608 A1 | 7/2016 | Packwood-Ace | |
| 2016/0304092 A1* | 10/2016 | Rebhan | B60W 30/16 |
| 2017/0057517 A1 | 3/2017 | Huq | |
| 2018/0265076 A1 | 9/2018 | Hall | |
| 2020/0001871 A1* | 1/2020 | Wang | B60W 30/16 |
| 2020/0094831 A1* | 3/2020 | Kudo | B60W 50/0097 |
| 2020/0216069 A1 | 7/2020 | Elflein | |
| 2022/0402491 A1* | 12/2022 | Jaekel | B60W 30/16 |

FOREIGN PATENT DOCUMENTS

| | | |
|---|---|---|
| CN | 103754224 A | 4/2014 |
| CN | 105818812 A | 8/2016 |
| CN | 106143488 A | 11/2016 |
| CN | 107428249 A | 12/2017 |
| CN | 107531245 A | 1/2018 |
| CN | 107985310 A | 5/2018 |
| CN | 108045373 A | 5/2018 |
| CN | 108074401 A | 5/2018 |
| CN | 109229098 A | 1/2019 |
| CN | 109466554 A | 3/2019 |
| CN | 109484407 A | 3/2019 |
| CN | 109532834 A | 3/2019 |
| CN | 109552327 A | 4/2019 |
| CN | 109591811 A | 4/2019 |
| CN | 110962848 A | 4/2020 |
| CN | 111267842 A | 6/2020 |
| CN | 111547055 A | 8/2020 |
| EP | 3693243 A1 | 8/2020 |
| JP | 2003516892 A | 5/2003 |
| JP | 2009292383 A | 12/2009 |
| JP | 2013180638 A | 9/2013 |
| JP | 2015009777 A | 1/2015 |
| JP | 2017170979 A | 9/2017 |
| KR | 20170035808 A | 3/2017 |

OTHER PUBLICATIONS

First Office Action of the parallel application JP2021-050545.
First Office Action of the parallel application KR10-2021-0038689.
NPL(including PART1 and PART2): "Research on freeway car following modeling and simulation in connected vehicle environment", by Haiyan Gu, a doctoral Dissertation, Southeast University, Jan. 2017.
The first Office Action of corresponding JP application No. 2021-050545.
The first OA of CN application No. 2020110273956.
NPL: "Design of Integrated Monitoring System for Charging Pile Based on CAN Communication", Digital Manufacture Science, vol. 18, No. 2, pp. 118-121, Jun. 2020.
EESR of EP application No. 21169836.0.

* cited by examiner

VEHICLE CONTROL METHOD AND APPARATUS, ELECTRONIC DEVICE AND STORAGE MEDIUM

CROSS-REFERENCE TO RELATED APPLICATION

This application claims priority to Chinese Patent Application No. 202011027395.6, filed on Sep. 25, 2020, which is hereby incorporated by reference in its entirety.

TECHNICAL FIELD

The present disclosure relates to the automatic driving technology in the field of automobile technology and, in particular, to a vehicle control method and apparatus, an electronic device and a storage medium.

BACKGROUND

With the development of the artificial intelligence technology, the automatic driving has attracted more and more attention, and gradually begun to change our driving habits.

Existing automatic driving typically takes a safe distance derived from theoretical calculations of physics as the core in designing vehicle control solutions on active safety. For example, in adaptive cruise control, stop-and-go is performed according to a safety braking distance between a front and a rear vehicle. In an automatic overtaking, corresponding measures are taken according to a safe distance set between two vehicles.

SUMMARY

The present disclosure provides a vehicle control method and apparatus, an electronic device and a storage medium.

According to a first aspect of the present disclosure, a vehicle control method is provided, including:

determining a target travelling scenario according to real-time monitoring data upon fulfilment of a preset update condition;

determining a target time headway according to the target travelling scenario, where the target time headway is used to dynamically adjust a relative motion state between an host vehicle and a surrounding vehicle;

controlling a vehicle according to the target time headway.

According to a second aspect of the present disclosure, a vehicle control apparatus is provided, including:

a scenario recognition module, configured to determine a target travelling scenario according to real-time monitoring data upon fulfilment of a preset update condition;

a processing module, configured to determine a target time headway according to the target travelling scenario, where the target time headway is used to dynamically adjust a relative motion state between an host vehicle and a surrounding vehicle;

where the processing module is further configured to control a vehicle according to the target time headway.

According to a third aspect of the present disclosure, an electronic device is provided, including:

at least one processor; and a memory, communicatively connected with the at least one processor, where:

the memory stores thereon instructions executable by the at least one processor, and when being executed by at least one processor, the instructions cause the at least one processor to carry out the method according to any one of the possible methods of the first aspect mentioned above.

According to a fourth aspect of the present disclosure, a non-transitory computer-readable storage medium is provided, storing thereon computer instructions which are used to cause a computer to carry out the method according to any one of the possible methods of the first aspect mentioned above.

According to a fifth aspect of the present disclosure, a program product is provided, including: a computer program, stored in a readable storage medium, where at least one processor of a server can read the computer program from the readable storage medium, and the computer program is executed by the at least one processor to cause the server to execute any one of the methods in the first aspect.

It should be understood that the content described in this section is not intended to identify the key or important features of the embodiments of the present disclosure, nor to limit the scope of the present disclosure. Other features of the present disclosure will be easily understood through the following description.

BRIEF DESCRIPTION OF DRAWINGS

The drawings are used to facilitate understanding of the present solution and do not constitute a limitation on the present disclosure. In the drawings.

DESCRIPTION OF EMBODIMENTS

Figure 1:
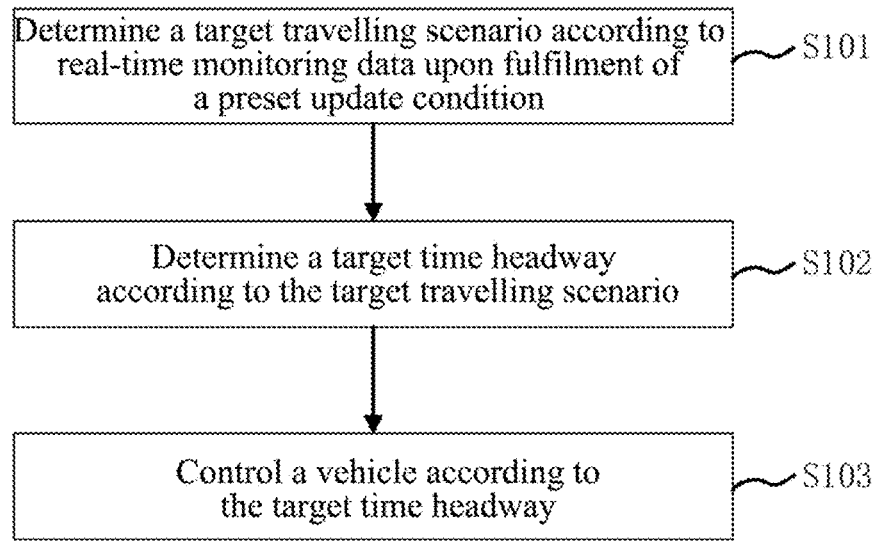
FIG. 1 is a schematic diagram according to a first embodiment of the present disclosure.

The exemplary embodiments of the present disclosure are described below with reference to the accompanying drawings, which include various details of the embodiments of the present disclosure to facilitate understanding. They should be considered as merely exemplary. Therefore, those of ordinary skill in the art should realize that various changes and modifications can be made to the embodiments described herein without departing from the scope and spirit of the present disclosure. Likewise, for clarity and conciseness, descriptions of well-known functions and structures are omitted in the following description.

With the development of artificial intelligence technology, automatic driving has become a topic attracting more and more attention. Low-level automatic driving, such as the assisted driving, has even been used in various types of vehicles, gradually changing the way we drive and travel. For example, adaptive cruise systems as seen in early low-level automatic driving are developments over cruise control technologies. In a high-speed scenario and a congested scenario, the adaptive cruise system can reduce frequent foot operations between the brake and the throttle pedals, relieving the fatigue after prolonged driving.

However, for automatic driving in the prior art, control strategies are typically designed from the perspective of the vehicle. For example, an operation scheme of an adaptive cruise system is as follows: when there is no vehicle ahead, the adaptive cruise system will make the vehicle travel at a speed set by a user through controlling the throttle and the brake; when following a vehicle ahead, a control unit can keep a distance from the vehicle by braking until a safe distance is restored if the distance to the vehicle ahead is less than a safe vehicle-following distance; when the distance to the vehicle ahead is less than the safe vehicle-following distance, the host vehicle may still drive at a set speed. The safe distance is typically defined in terms of the speed of the host vehicle and the speed of the vehicle ahead, as well as the vehicle-following strategy adopted, such as time headway and so on. However, there is a fundamental problem in this strategy because it fails to realize that automatic driving is not completely unmanned, i.e., the driver is still the most important control decision-maker in the vehicle travelling process. The prior art overlooks the perceptions of the driver about the environment surrounding the vehicle, the road condition and the surrounding vehicles. This causes the driver to frequently intercept automatic driving with manual driving because of his/her own perceptions. For example, other vehicles are more likely to cut in when the system is trying to keep some leeway while the vehicle is automatically following another vehicle. Or, a cruising may be interrupted by the driver since he/she feels unsafe when the vehicle is trailing a large truck along a highway. These decisions to manually intervene are sometimes only some impulsive decisions of the driver, such as retaliatory operations driven by road rages caused by, e.g., being cut in, being hit by an abrupt acceleration, being cut off by an abrupt deceleration, and so on. All of these are caused by the fact that automatic driving schemes are not designed from the perspective of perceptions.

In a high-speed scenario, a sufficient safe distance can give the driver or passenger a sufficient "sense of security", but too much safe distance can solicit more overtakes, affecting the usage frequency of the vehicle-following function. In other words, the driver will be more likely to terminate the automatic driving because of poor user experience.

In addition, when the view is blocked by a truck, the driver or passenger may experience some claustrophobia and begin to manually disengage. When at high speeds, such a move can easily cause traffic accidents. For example e.g., when the driver is unaware of a tunnel ahead or a closed-off lane ahead, overtaking a truck can lead to a traffic accident.

The sense of security is closely related to a driver's driving ability, field of view and road conditions. Therefore, the inventive concept of the present disclosure is based on the perceptions of the driver. The design of the automatic driving system should also define the safety and the control strategy according to the perceptions and control capabilities of the system in different scenarios. The perceptions and control capabilities of the same system typically behave differently in different scenarios. For example: a road turn scenario can pose problems to the sense of distance and perceptual continuity with respect to obstacles. In areas with significant ups and downs, such as upslope and downslope, the sense of distance to obstacles and the vehicle controllability are also poor. The field of view in lane merging and exporting regions are poor, and abrupt encounters with fast moving obstacles are likely. Large trucks and buses can also cause limited field of view.

In order to solve the problem that the prior arts do not control the vehicle according to the perceptions of the driver on the travelling scenario of the vehicle, the present disclosure provides a vehicle control method that will be introduced in the following through embodiments.

FIG. 1 is a schematic diagram according to a first embodiment of the present disclosure. As shown in FIG. 1, the vehicle control method provided in this embodiment includes:

S101, determine a target travelling scenario according to real-time monitoring data when a preset update condition is fulfilled.

In this step, the preset update condition includes: a current travelling scenario has changed, a current state has lasted for a duration exceeding a preset time threshold, a vehicle control parameter has been updated according to a preset cycle, a response to an operation instruction to a user input and so forth.

The target travelling scenario is a scenario that easily causes the driver to interrupt the automatic driving, including: a high-speed scenario, a low-speed scenario, a special vehicle scenario, a first characteristic scenario frequent-cut-in scenario, a road turn scenario, an upslope/downslope scenario, a lane merging/exporting scenario, a low-visibility scenario and a combination scenario combined with at least two of the above scenarios.

The high-speed scenario is when the travelling speed of vehicle is greater than a preset high-speed threshold; the low-speed scenario is when the travelling speed of vehicle is less than or equal to a preset low-speed threshold; the special vehicle scenario is when there are special vehicles such as trucks, buses, motorcycles and so forth, around; the first characteristic scenario frequent-cut-in scenario is when monitoring data shows that the lane of the host vehicle has been cut in by more than a preset cut-in threshold; the lane merging/exporting scenario is when an intersection of branch roads such as an entrance or exit of a highway, or an entrance or exit of an urban overhead road.

In a possible design, the real-time monitoring data includes a current vehicle speed, so that the high-speed/low-speed scenarios can be determined based on the current vehicle speed.

In a possible design, the real-time monitoring data also includes a real-time road condition image, which is captured by a vehicle-mounted camera. By performing image recognition on the real-time road condition image, the presence of special vehicle around can be detected, and the frequent-cut-in scenario can be recognized.

In a possible design, the real-time monitoring data also includes positioning data and high accuracy map data. The positioning data can be GPS positioning data or Beidou navigation positioning data and so on. The high accuracy map data includes road information, road condition information, slope information and so on. Through the road information, it can be known whether the vehicle is about to turn, whether there is a merging entrance or exporting exit ahead; through the slope information, it can be recognized whether the vehicle is about to enter an upslope/downslope scenario with a large elevation change. Since a steep slope will block the field of view of the driver the sensing capability of the monitoring system of the vehicle will be degraded to timely detect or sense the risk factors lying in the slope ahead.

In a possible design, the real-time monitoring data also includes weather data, e.g., an early warning regarding fog or sand storm, etc., which helps determining the low-visibility scenario.

S102, determine a target time headway according to the target travelling scenario.

In this step, the target time headway is used to dynamically adjust the relative motion state between the host vehicle and surrounding vehicles.

It should be noted that the time headway is an important technical parameter index in automatic driving, which is calculated based on the distance between two vehicles and a current vehicle speed of the host vehicle.

In different target travelling scenarios, on the basis of establishing base time headway related to a safe distance according to a travelling state of the vehicle itself, a perception correction model can be provided for different scenarios, to correct the base time headway, obtaining the target time headway.

In a possible design, the perception correction model can be a neural network model which, after being trained using big data, adopts various correction manners for different regions to obtain an optimal correction effects suited to distinct regions, such as a urban or rural regions.

In a possible design, the perception correction model can combine a driving habit of a user to correct the time headway, thus obtaining the target time headway suitable to driving habits of different users.

S103, control the vehicle according to the target time headway.

In this step, the target time headway can be reached by setting to control the vehicle to go through different gradual processes based on different target travelling scenarios.

For example, when the vehicle is in a frequent-cut-in scenario such as a congested road, and the current vehicle speed of the vehicle is low, the vehicle can be controlled to quickly reach the target time headway in order to prevent from being cut-in any further. When the vehicle is in a frequent-cut-in scenario with multiple vehicles moving in parallel on a highway, in order to avoid a traffic accident caused by an abrupt speed change of the vehicle, a smoother change process of the time headway can be set, so as to make the vehicle reach the target time headway more slowly. In this process, the target time headway can be modified further according to a change in the target travelling scenario to avoid the situation in which a sudden change in the target travelling scenario, e.g., a closed road section or being cut-in, causes the driver to perceive the presence of a security threat. At this time, the target time headway and speed of reaching the target time headway can be configured further, to improve the user experience of the automatic driving.

According to the technical solutions of the embodiments of the present disclosure, from the perspective of the perception of the driver or passenger, dynamic safety time headway is redefined based on different travelling scenarios which are more likely to cause a driver to "feel unsafe". The target time headway is determined based on the monitored target travelling scenario. Furthermore, the state of the host vehicle is controlled dynamically, so as to reach the target time headway. Moreover, correction can be made in time if the target scenario changes during this process.

Specifically, a target travelling scenario is determined according to a real-time monitoring data when a preset update condition has been fulfilled. Then, the target time headway is determined according to the target travelling scenario, and finally the vehicle is controlled according to the target time headway. These solves the problem in the prior art automatic driving control where transitional attention is paid to the state of the vehicle ahead without realizing the perception of the driver or passenger of the host vehicle on the travelling scenario, a factor that leads to more manual intervention by the driver and diminished user experience of the automatic driving. Traffic accident caused by misinformed intervention based on perceived safety threat of the driver, e.g., rear-end or front-end collisions resulted from abrupt acceleration or deceleration after being cut-in too much, is also prevented. The user experience is improved, and the user will be more confident about the safety of the automatic driving.

Figure 2:
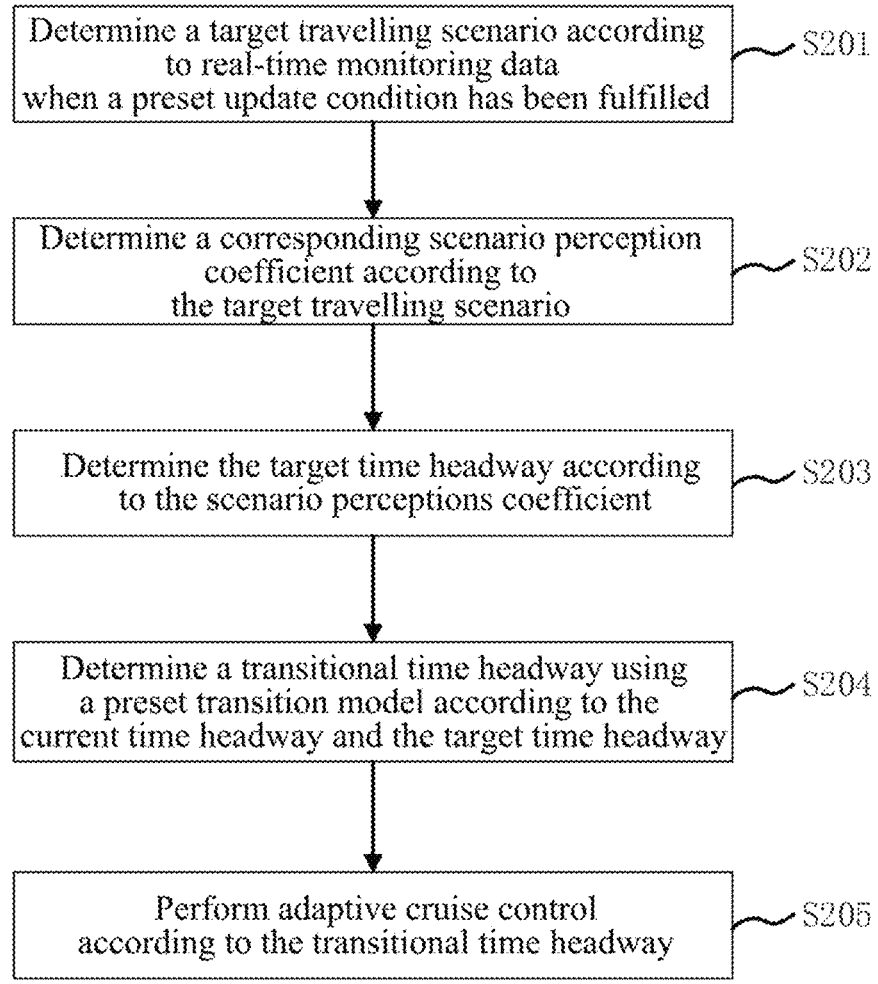
FIG. 2 is a schematic diagram according to a second embodiment of the present disclosure.

FIG. 2 is a schematic diagram according to the second embodiment of the present disclosure. As shown in FIG. 2, the vehicle control method provided in this embodiment includes:

S201, determine a target travelling scenario according to real-time monitoring data when a preset update condition has been fulfilled.

In this step, the preset update condition is to determine that the current travelling scenario has changed according to the real-time monitoring data. In this embodiment, the automatic driving control system in the vehicle finds out that the travelling scenario has changed according to the real-time monitoring data.

Figure 3:
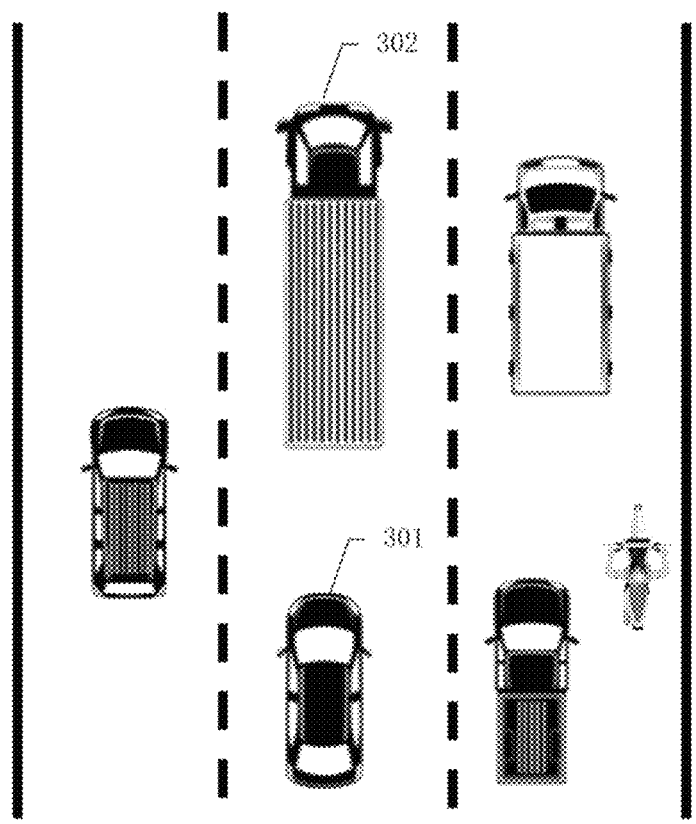
FIG. 3 is a schematic diagram of a first scenario of the second embodiment of the present disclosure.

FIG. 3 is a schematic diagram of the first scenario of the second embodiment of the present disclosure. As shown in FIG. 3, the vehicle 301 is in the auto-driving mode of adaptive cruise control, and is gradually approaching a truck 302 from behind in the same lane as that of the truck 302.

When the target travelling scenario of the vehicle is as shown in FIG. 3, specifically, "real-time monitoring data" includes the current vehicle speed, then the "determine the target travelling scenario according to the real-time monitoring data" includes:

determining a speed type in the target travelling scenario according to current vehicle speed, and setting the scenario perception coefficient correspondingly, where the speed type includes a high speed scenario and a low speed scenario.

The perceived safety and actual safety are different for a driver encountering a slow vehicle ahead when running at a high speed or encountering a slow vehicle ahead when running at a low speed. Also, for different drivers, the perceptions on safe distances will change according to their driving habits and driving experience. Therefore, the present disclosure takes the high-speed scenario and the low-speed scenario as two base scenarios to make a base decision. In the high-speed scenario, the vehicle control strategy is more conservative and stable, while in the low-speed scenario, the vehicle control strategy can be set to be more dynamic or volatile to quickly change the travelling state of the vehicle. In addition, the distance to the vehicle ahead needs to be widened to ensure a safe braking distance in the high-speed scenario, while the distance to the vehicle ahead can be appropriately reduced in the low-speed scenario.

Further, in a possible design, the "real-time monitoring data" includes the real-time road condition image, and the real-time road condition image is a video image acquired by a vehicle-mounted camera in real time, then the "determine a target travelling scenario according to real-time monitoring data" includes:

determining a vehicle type corresponding to a vehicle ahead according to a second preset number of frames of the real-time road condition image;

determining that the target travelling scenario is a special vehicle scenario if the vehicle type is a special vehicle.

For example, when the second preset number of frames is 50 frames, the target travelling scenario can be determined to be the special vehicle scenario if the vehicles ahead identified by an image recognition model in a continuous train of 50 frames are all special vehicles, such as trucks, buses, motorcycles and so on. Since the special vehicles such as trucks or buses and other large vehicles often block field of view, while motorcycles often change lane suddenly and cause traffic accidents. These are important factors in the perceptions of the driver that can easily lead to "perceived safety threat", thus the special vehicle scenario is provided correspondingly.

Figure 4:
FIG. 4 is a schematic diagram of a second scenario of the second embodiment of the present disclosure.

FIG. 4 is a schematic diagram of a second scenario of the second embodiment of the present disclosure. As shown in FIG. 4, in a low-speed congested scenario, the vehicle 401 follows the vehicle directly ahead for adaptive cruise. Meanwhile, the vehicle 402 cuts in front of the vehicle 401 from an adjacent lane, while the vehicle 403 has arrived at an intersection of the two lanes. At this time, it is detected that the travelling scenario has changed according to the real-time monitoring data of the vehicle 401.

In the scenario shown in FIG. 4, the "determine target travelling scenario according to real-time monitoring data" includes:

In a first preset number of frames of a real-time road condition image, it is determined that the target travelling scenario is a frequent-cut-in scenario if the number of changes of the vehicle directly ahead is greater than a preset number of times.

For example, the first preset number of frames is 150 frames. Each time a change of the vehicle ahead is recognized among this continuous train of 150 frames of images, the number of cut-in is automatically increased by 1. If the number of cut-in is greater than a preset number of, e.g., 3, the target travelling scenario is determined to be the frequent-cut-in scenario. In this scenario, it is easy to cause the driver to be discontent with the adaptive cruise and switch to manual control if the vehicle is cut-in for too many times. This can easily cause scratching and collision accidents. Therefore, when such scenario is recognized, the prior art approach of keeping a safe distance no longer applies. Instead, the distance to the vehicle ahead should be kept as close as possible.

In this embodiment, the "real-time monitoring data" includes positioning data and high accuracy map data, and "determine a target travelling scenario according to real-time monitoring data" includes:

determining a current location scenario type of the host vehicle according to the positioning data and the high accuracy map data, and setting a scenario perception coefficient correspondingly.

The location scenario type includes: a road turn scenario, a upslope and downslope scenario, a merging and exporting scenario, etc.

Figure 5:
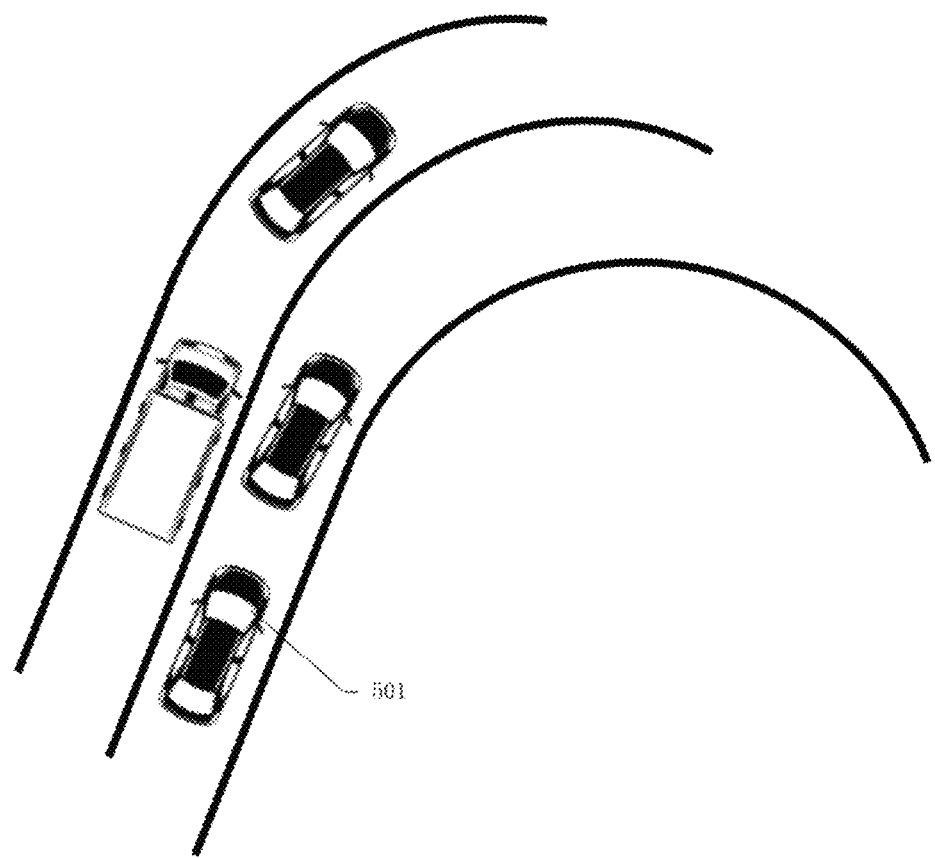
FIG. 5 is a schematic diagram of a third scenario of the second embodiment of the present disclosure.

FIG. 5 is a schematic diagram of a third scenario of the second embodiment of the present disclosure. As shown in FIG. 5, a vehicle 501 follows a vehicle ahead in an adaptive cruising. At this time, a control system of the automatic driving finds out, according to the current position of the vehicle and high accuracy map data, that the vehicle is about to enter a road turn scenario, namely a road turn whose curvature is beyond a preset range is located. Excessive curvature usually means presence of obstacles in field of view, such as a mountain, or means the road is being closed for maintenance. This type of target travelling scenario entails loss of field of view, making the driver nervous. In order to improve the user experience of adaptive cruise control, the target time headway will be widened upon recognizing of this scenario.

Figure 6:
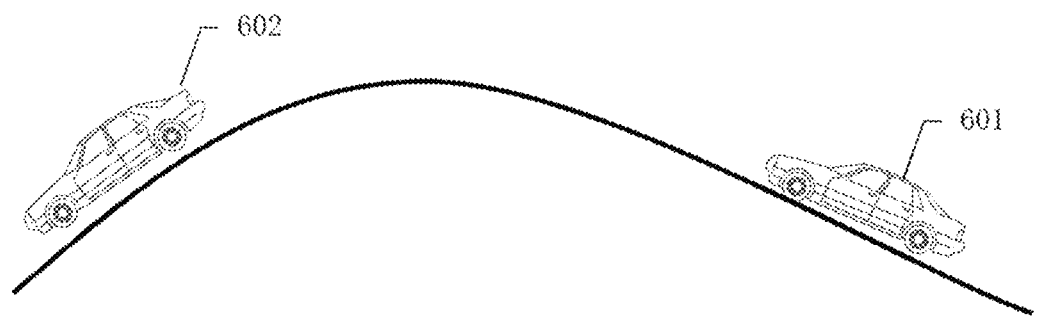
FIG. 6 is a schematic diagram of a fourth scenario of the second embodiment of the present disclosure.

FIG. 6 is a schematic diagram of a fourth scenario of the second embodiment of the present disclosure. As shown in FIG. 6, the vehicle 601 and the vehicle 602 are in an upslope and downslope travelling scenario, respectively. Since the slope can block the camera, radar and other monitor device of the vehicle, the field of view of the driver will be limited in this scenario, resulting in impeded perception. By recognizing the travelling scenario of upslope and downslope travelling scenario, occurrence of traffic accidents can be prevented. Therefore, it is necessary to properly modify the target time headway.

It should also be noted that the merging/exporting scenario is that when the vehicle has arrived at an intersection with reduced number of lanes, or at an entrance to, or exit from, a highway, locations where car scraping and collision are more likely to happen. In this case, existing adaptive cruise control will usually be taken over by manual control, but such a travelling scenario strongly calls for adaptive cruise control in holidays and rush hours. In order to solve this dilemma, this scenario also needs to be recognized by the automatic driving control to enable more specialized vehicle control.

In a possible design, the "real-time monitoring data" also includes weather data, and the "determine a target travelling scenario according to the real-time monitoring data" includes:

determining a low-visibility scenario according to weather data, positioning data and high accuracy map data.

Existing adaptive cruise control systems are unable to recognize extreme weather conditions such as sandstorms and heavy fog. At this time, the driver may have a great sense of distrust on the automatic driving due to diminished visible distance. Hence, to improve the usage rate of adaptive cruise in this travelling scenario, it is necessary to adjust and modify the time headway to make the user feel safer.

It should be noted that the target travelling scenario may be a combined scenario, i.e., a combination of at least two of the speed type, the special vehicle scenario, the low-visibility scenario, and the location scenario.

S202, determine a corresponding scenario perception coefficient according to the target travelling scenario.

In this step, the scenario perception coefficient provides a medium for connecting the target travelling scenario with the adjustment of the time headway. The setting of the scenario perception coefficient can be obtained according to the target travelling scenario using big data statistics. Neural network models may also be used to implement automatic intelligent learning. For different regions and different users, different scenario perception coefficient settings can be applied.

Table 1 lists values of perception coefficients corresponding to some target travelling scenarios of the embodiments:

TABLE 1

| Target travelling scenario | Scene perception coefficient |
| --- | --- |
| Road turn scenario | 1.1 |
| Upslope and downslope scenario | 1.1 |
| Special vehicle scenario | 1.2 |
| Cut-in scenario | 1.1 |
| Merging and exporting scenario | 1.2 |
| Low-visibility scenario | 1.5 |

It should be noted that the scenario perception coefficient of the combined scenario is a composite scenario perception coefficient determined according to the scenario perception coefficients corresponding to individual scenario types in the combined scenario. In an implementation, the composite scenario perception coefficient is a product of the scenario perception coefficients corresponding to individual scenario types. In another implementation, corresponding perception weights can be assigned to individual scenario types, and then the composite scenario perception coefficient is obtained by summing the product of the scenario perception coefficients corresponding to individual scenario types and the corresponding perception weights. In this way, factors from individual scenario types can be comprehensively considered, and time headway can be adjusted more accurately.

In a possible design, after the "determine a target travelling scenario according to real-time monitoring data", the method further includes:

determining prompt information according to target travelling scenario, where the prompt information is used to prompt a user that the vehicle is about to enter a vehicle control adjustment state corresponding to the target travelling scenario; and outputting the prompt information.

By prompting the user when the target travelling scenario has changed or is about to change, the user can feel the intelligence in the automatic driving system. Moreover, this can provide a warning to remind the user that there is a security hazard around and he or she should get ready to take over the vehicle control at any moment. It can also prompt the user that the automatic driving system has had a countermeasure prepared for the target travelling scenario and there is no need to keep alert all the time, thereby reducing traffic accidents caused by manual override.

S203, determine the target time headway according to the scenario perception coefficient.

This step specifically includes:

determining a base time headway according to a current vehicle speed and a distance to a target vehicle ahead;

determining the target time headway according to a base time headway and the scenario perception coefficient.

For example, the base time headway $\Gamma_{base}$ is set to be a quotient of the distance between the host vehicle and the target vehicle ahead and the current vehicle speed, then the target time headway $\Gamma_{target}$ can be expressed by formula (1) as follows:

$$\Gamma_{target} = r \cdot \Gamma_{base} \tag{1}$$

where r is the scenario perception coefficient.

It should be noted that the target time headway is a function value of the scenario perception coefficient and the base time headway, and those skilled in the art can configure the functional relationship between the three according to specific circumstance, which is not limited in this disclosure. Or, the scenario perception coefficient and the base time headway are input into the corresponding time headway adjustment model to obtain the target time headway. There are many ways to implement the time headway adjustment model, which can be statistical model of historical data, or self-learning model such as neural network.

In a possible design, the "target vehicle ahead" includes: a vehicle in the same lane and a vehicle in an adjacent lane. Correspondingly, the "determine the base time headway according to the current vehicle speed and the distance to the target vehicle ahead" includes:

determining a first time headway according to a distance between the host vehicle and the vehicle ahead in the same lane;

determining a second time headway according to a distance between the host vehicle and the vehicle in the adjacent lane;

determining the base time headway according to the first time headway and the second time headway.

In order to avoid being cut-in, or to discover the intention of a vehicle in the adjacent lane to cut-in based on the real-time road condition image in the real-time monitoring data, such as multiple attempts by the vehicle in the adjacent lane to engage or cross a lane marking, merely calculating the first time headway relative to the vehicle ahead in the same lane would be insufficient. The first time headway can be the distance between the host vehicle and the vehicle ahead in the same lane, divided by the current vehicle speed of the host vehicle, and the second time headway can be a longitudinal distance between a vehicle in an adjacent lane and the host vehicle, divided by the current vehicle speed of the host vehicle. Finally, the base time headway is derived by obtaining a weighted sum of the first time headway and the second time headway.

S204, determine a transitional time headway using a preset transition model according to the current time headway and the target time headway.

This step specifically includes:

firstly, determine a transition coefficient according to the current time headway during a preset time interval, including:

determining a change rate of the current time headway according to a record of the time headway in the preset time interval;

determining the transition coefficient according to the change rate and the target travelling scenario.

Specifically, the average change rate of the time headway of the host vehicle within, e.g., 3 minutes is calculated, or the function of the time headway varying with time is obtained according to a fitting algorithm, and the derivative of the function is calculated to derive the instantaneous change rate of the time headway, and then the change rate is fed into the model or function relationship corresponding to the target travelling scenario to obtain the transition coefficient. The above process can be expressed by formula (2) as follows:

$$w_1 = f(\text{std}(\Gamma_{current})/\text{avg}(\Gamma_{current})) \tag{2}$$

where $\text{std}(\Gamma_{current})/\text{avg}(\Gamma_{current})$ represents the change rate of the current time headway $\Gamma_{current}$ within a certain time range (such as 3 minutes), $f$ is a function of a change rate over time, where larger change rate leads to smaller output value, and smaller change rate leads to larger output value. The value range of the transition coefficient $w_1$ is between 0 and 1. It should be noted that the present disclosure does not specifically limit the function, and those skilled in the art can select a specific function form according to actual conditions.

The setting of the transition coefficient is to facilitate controlling the process in which the time headway reaches the target time headway. For example, in a target travelling scenario with low speed and frequent cut-in, the process of reaching the target time headway should be fast in order to quickly catch up with the vehicle ahead and prevent from being cut-in, but not too fast, so as to avoid too much impact on the persons in the vehicle. For a target travelling scenario with high-speed and special vehicle, reaching the target time headway too fast may cause rear-end collision, or cause the persons in the vehicle to panic, so a smoother process is needed to reach the target time headway.

Then, the change amount in the time headway corresponding to the next adjustment moment is determined according to the transition coefficient and the target time headway.

Specifically, for example, formula (3) can be used to express the change amount of the time headway $\Delta\Gamma$, and formula (3) is as follows:

$$\Delta\Gamma = w_1(\Gamma_{target} - \Gamma_{current}) \quad (3)$$

where $\Gamma_{target}$ is the target time headway, $w_1$ is the transition coefficient, and $\Gamma_{current}$ is the current time headway.

Of course, in another possible implementation manner, the change amount in the time headway is a product of the transition coefficient and the target time headway.

It should be noted that the calculation method for change amount in the real-time distance corresponding to different target travelling scenarios can be different to adapt to different transition requirements, to achieve a smooth transition, and timely respond in different target travelling scenarios, thereby improving the intelligent level of the vehicle control in automatic driving.

Next, the transitional time headway for a next adjustment moment is determined according to the change amount in time headway and the current time headway.

Specifically, for example, formula (4) can be used to express the transitional time headway, and formula (4) is as follows:

$$\Gamma_{setting} = \Delta\Gamma + \Gamma_{current} \quad (4)$$

where $\tau_{setting}$ is the transitional time headway, $\Delta\Gamma$ is the change amount in time headway, $\Gamma_{current}$ is the current time headway.

It should be noted that the transitional time headway can also be implemented in different ways according to different target travelling scenarios, and is not limited to the way shown in formula (4). Those skilled in the art can choose the implementation as needed according to the actual situation.

S205, perform adaptive cruise control according to the transitional time headway.

In this step, the acceleration of the vehicle is determined according to the transitional time headway, and then an engine control command or a brake control command is generated. It should be noted that, in this embodiment, the controller of the automatic driving will continue looking for sudden changes in the target travelling scenario during the transition phase of the vehicle. This is intended to prevent misjudgment caused by over sensitive response, or to get ready for sudden deterioration of the environment of travelling scenario caused by sudden lane change of a surrounding vehicle, or to timely respond to the changes in the target travelling scenario, thus improving the safety and reliability of adaptive cruise control.

This embodiment provides a vehicle control method, which determines a target travelling scenario according to real-time monitoring data upon fulfilment of a preset update condition, and then determines a corresponding scenario perception coefficient according to the target travelling scenario, and next determines a target time headway according to the scenario perception coefficient, and determines a transitional time headway with the preset transition model according to the current time headway and target time headway, and finally performs adaptive cruise control according to the transitional time headway. It solves the problem: the prior arts pay too much attention to the state of the vehicle ahead to perform the automatic driving control, but ignores the perceptions of the driver or passenger of the host vehicle in the travelling scenario, which is a cause for human intervention by the driver and affects the experience of the automatic driving. It avoids the misjudgment and intervention caused by perceived safety threats of the driver, thus prevents traffic accidents, for example, rear-end collisions or bumping accidents caused by abrupt acceleration or deceleration when being cut-in frequently. It improves the user experience of the user and a sense of trust on the safety of the automatic driving.

Figure 7:
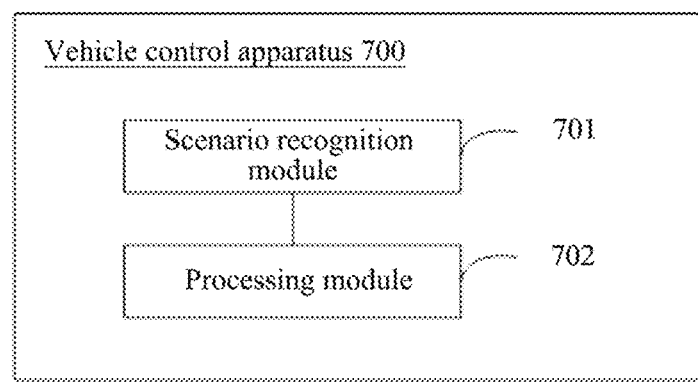
FIG. 7 is a schematic diagram of a third embodiment according to the present disclosure.

FIG. 7 is a schematic diagram according to the third embodiment of the present disclosure. As shown in FIG. 7, a vehicle control apparatus 700 provided in this embodiment includes:

a scenario recognition module 701, configured to determine a target travelling scenario according to real-time monitoring data when a preset update condition is fulfilled;

a processing module 702, configured to determine a target time headway according to the target travelling scenario, where the target time headway is used to dynamically adjust a relative motion state of the vehicle and surrounding vehicles;

where the processing module 702 is further configured to control a vehicle according to the target time headway.

In a possible design, the fulfilment of the preset update condition includes:

the processing module 702, configured to determine that the current travelling scenario has changed according to the real-time monitoring data.

In a possible design, the processing module 702, configured to determine the target following time distance according to the target travelling scenario, including:

the processing module 702, configured to determine a corresponding scenario perception coefficient according to the target travelling scenario;

the processing module 702, further configured to determine the target time headway according to the scenario perception coefficient.

Optionally, the processing module 702, further configured to control the vehicle according to the target time headway, including:

the processing module 702, further configured to determine a transitional time headway with the preset transition model, according to the current time headway and the target time headway.

the processing module 702, further configured to perform adaptive cruise control according to the transitional time headway.

In a possible design, the processing module 702, further configured to determine a transitional time headway with the preset transition model, according to the current time headway and the target time headway, including:

the processing module 702, further configured to determine a transition coefficient according to the current time headway during a preset time interval;

the processing module 702, further configured to determine the change amount of the time headway corresponding to a next adjustment moment according to the transition coefficient and the target time headway;

the processing module 702, further configured to determining the transitional time headway at a next adjustment moment according to the change amount of the time headway and the current time headway.

In a possible design, the processing module 702, further configured to determine a transition coefficient according to the current time headway during a preset time interval, including:

the processing module 702, further configured to determine the change rate of the current time headway according to the record of the time headway during the preset time interval;

the processing module 702, further configured to determine the transition coefficient according to the change rate and the target travelling scenario.

Optionally, after the scenario recognition module 701, configured to determine the target travelling scenario according to real-time monitoring data, the method further includes:

the processing module 702, further configured to determine prompt information according to the target travelling scenario, where the prompt information is used to prompt a user that the vehicle will enter a vehicle control adjustment state corresponding to the target travelling scenario;

the processing module 702, further configured to output the prompt information.

In a possible design, the processing module 702, further configured to determine the target time headway according to the scenario perception coefficient, including:

the processing module 702, further configured to determine the base time headway according to the current vehicle speed and the distance to the target vehicle ahead;

the processing module 702, further configured to determine the target time headway according to the base time headway and the scenario perception coefficient.

In a possible design, the processing module 702, further configured to determine the target time headway according to the base time headway and the scenario perception coefficient, including:

the processing module 702, further configured to take the product of the scenario perception coefficient and the base time headway as the target time headway.

Optionally, the target vehicle ahead includes: a vehicle in the same lane and a vehicle in an adjacent lane. Correspondingly, the processing module 702, further configured to determine the base time headway according to the current vehicle speed and the distance to the target vehicle ahead, including:

the processing module 702, further configured to determine a first time headway according to a distance between the host vehicle and a vehicle ahead in the same lane;

the processing module 702, further configured to determine a second time headway according to the projection distance between a vehicle in a adjacent lane and the host vehicle in the adjacent lane;

the processing module 702, further configured to determine the base time headway according to the first time headway and the second time headway.

In a possible design, the real-time monitoring data includes the current vehicle speed, and the scenario recognition module 701, configured to determine the target travelling scenario according to the real-time monitoring data, including:

the scenario recognition module 701, configured to determine a speed type in the target travelling scenario according to the current vehicle speed, and set the scenario perception coefficient correspondingly, where the speed type includes a type in high-speed scenario and a type in low-speed scenario.

Optionally, the real-time monitoring data includes a real-time road condition image, and the scenario recognition module 701, configured to determine the target travelling scenario according to the real-time monitoring data, including:

the scenario recognition module 701, configured to determine the target travelling scenario to be a frequent-cut-in scenario and to correspondingly set the scenario perception coefficient if a number of changes of a vehicle ahead is greater than a preset number of times for a first preset number of frames of the real-time road condition image.

In a possible design, the scenario recognition module 701, configured to determine the target travelling scenario according to real-time monitoring data, including:

the scenario recognition module 701, configured to determine the vehicle type corresponding to the vehicle ahead according to a second preset number of frames of the real-time road condition image;

The scenario recognition module 701, further configured to determine that the target travelling scenario is the special vehicle scenario, and correspondingly set the scenario perception coefficient, if the vehicle type is a special vehicle.

Optionally, the real-time monitoring data includes positioning data and high accuracy map data. The scenario recognition module 701, configured to determine the target travelling scenario according to the real-time monitoring data, including:

the scenario recognition module 701, configured to determine the current location scenario type of the host vehicle according to the positioning data and the high accuracy map data, and correspondingly set the scenario perception coefficient.

In a possible design, the real-time monitoring data includes weather data, and the scenario recognition module 701, configured to determine a target travelling scenario according to the real-time monitoring data, including:

the scenario recognition module 701, configured to determine a low-visibility scenario according to the weather data, the positioning data, and the high accuracy map data, and correspondingly set the scenario perception coefficient.

In a possible design, the target travelling scenario is a combined scenario, and the combined scenario is a combination of at least two types of the speed type, the special vehicle scenario, the low-visibility scenario, and the location scenario. The scenario perception coefficient of the target travelling scenario is a composite scenario perception coefficient determined according to the scenario perception coefficient corresponding to each scenario type in the combined scenario.

It is worth noting that the vehicle control apparatus 700 provided in the embodiment shown in FIG. 7 can execute the method provided in any of the method embodiments above, and the specific implementation principles, technical features and the explanations of professional terms and technical effects are similar, which will not be repeated herein.

According to embodiments of the present disclosure, the present disclosure also provides an electronic device and a readable storage medium.

Figure 8:
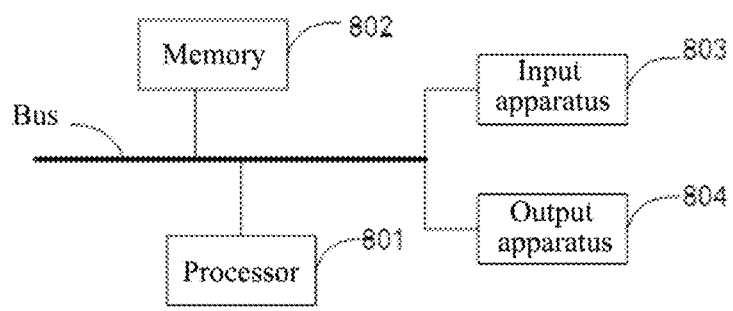
FIG. 8 is a block diagram of an electronic device for implementing the vehicle control method of an embodiment of the present disclosure.

FIG. 8 shows a block diagram of an electronic device of a vehicle control method according to an embodiment of the present disclosure. The electronic device is intended to represent various forms of digital computers, such as laptop computers, desktop computers, workstations, personal digital assistants, servers, blade servers, large computers, and other computers as appropriate. The electronic device can also represent various forms of mobile devices, such as personal digital assistances, cellular phones, smart phones, wearable devices, and other similar computing devices. The components shown, their connections and relationships, and their functions are merely examples, and are not intended to limit the implementation of the present disclosure described and/or claimed herein.

As shown in FIG. 8, the electronic device includes: one or more processors 801, a memory 802, and interfaces for connecting various components, including a high-speed interface and a low-speed interface. The various components are connected to each other by using different buses, and can be installed on a common motherboard or installed in other ways as required. The processor may process instructions executed in the electronic device, including instructions stored in or on the memory to display graphical information of the GUI on an external input/output apparatus (such as a display apparatus coupled to an interface). In other embodiments, multiple processors and/or multiple buses may be used with multiple memories if necessary. Similarly, multiple electronic device can be connected, and each apparatus provides some necessary operations (for example, as a server array, a group of blade servers, or a multi-processor system). A processor 801 is taken as an example in FIG. 8.

The memory 802 is a non-transitory computer-readable storage medium provided in the present disclosure. The memory stores instructions executable by at least one processor to enable the at least one processor to execute the vehicle control method provided in the present disclosure. The non-transitory computer-readable storage medium of the present disclosure stores computer instructions, and the computer instructions are used to make a computer execute the vehicle control method provided in the present disclosure.

As a non-transitory computer-readable storage medium, the memory 802 can be configured to store non-transitory software programs, non-transitory computer-executable programs and modules, such as program instructions/modules corresponding to a vehicle control method in an embodiment of the present disclosure (for example, the scenario recognition module 701 and the processing module 702 shown in FIG. 7). The processor 801 executes various functional applications and data processing of the server by running non-transient software programs, instructions, and modules stored in the memory 802, that is, implements the vehicle control method in the foregoing method embodiment.

The memory 802 may include a storage program region and a storage data region, where, the storage program region may store an operating system and an application program required by at least one function; the storage data region may store data created according to the usage of an electronic device controlled by the vehicle. In addition, the memory 802 may include a high-speed random access memory, and may also include a non-transitory memory, such as at least one magnetic disk storage means, a flash memory means or other non-transitory solid-state storage means. In some embodiments, the memory 802 may optionally include a memory remotely provided with respect to the processor 801, and these remote memories can be connected to an electronic apparatus controlled by the vehicle through a network. Examples of the aforementioned networks include, but are not limited to, the Internet, corporate intranets, local area networks, mobile communication networks, and combinations thereof.

The electronic device of the vehicle control method may further include: an input apparatus 803 and an output apparatus 804. The processor 801, the memory 802, the input apparatus 803, and the output apparatus 804 may be connected through a bus or in other ways. The connection through a bus is taken as an example in FIG. 8.

The input apparatus 803 can receive input digital or character information, and generate key signal input related to the user settings and function control of an electronic device controlled by the vehicle, such as touch screen, keypad, mouse, track pad, touch pad, indicator stick, multiple mouse button(s), trackballs, joysticks and other input apparatus. The output apparatus 804 may include a display apparatus, an auxiliary lighting device (for example, LED), a tactile feedback apparatus (for example, a vibration motor), and the like. The display apparatus may include, but is not limited to, a liquid crystal display (LCD), a light emitting diode (LED) display, and a plasma display. In some embodiments, the display apparatus may be a touch screen.

Various implementations of the systems and techniques described herein can be implemented in a digital electronic circuit system, an integrated circuit system, an application specific ASIC (application specific integrated circuit), a computer hardware, a firmware, a software, and/or combinations thereof. These various embodiments may include: being implemented in computer program(s), the computer program(s) may be executed and/or interpreted on a programmable system including at least one programmable processor, the programmable processor can be a dedicated or universal programmable processor that can receive data and instructions from the storage system, at least one input apparatus, and at least one output apparatus, and transmit the data and instructions to the storage system, the at least one input apparatus and the at least one output apparatus.

These computer programs (also referred to as programs, software, software applications, or codes) include machine instructions for programmable processors, and can be implemented using high-level procedures and/or object-oriented programming languages, and/or assembly/machine languages. As used herein, the terms "machine-readable medium" and "computer-readable medium" refer to any computer program product, device, and/or apparatus used to provide machine instructions and/or data to a programmable processor (For example, magnetic disk, optical disk, memory, programmable logic apparatus (PLD)), including machine-readable media that receive machine instructions as machine-readable signals. The term "machine-readable signal" refers to any signal used to provide machine instructions and/or data to a programmable processor.

In order to provide interaction with a user, the systems and techniques described herein can be implemented on a computer, which includes: a display apparatus for displaying information to the user (for example, a CRT (cathode ray tube) or LCD (liquid crystal display) monitor)); and a keyboard and pointing apparatus (for example, a mouse or a trackball) through which the user can provide input to the computer. Other types of apparatus can also be used to provide interaction with a user; for example, the feedback provided to the user can be any form of sensory feedback (for example, visual feedback, auditory feedback, or tactile feedback); and can be in any form (including acoustic input, voice input, or tactile input) to receive input from the user.

The systems and technologies described herein can be implemented in a computing system that includes background components (for example, as a data server), or a computing system that includes middleware components (for example, an application server), or a computing system that includes front-end components (for example, a user computer with a graphical user interface or web browser, through which the user can interact with the implementation of the system and technology described herein), or a computing system that includes any combination of such background components, middleware components or front-end components. The components of the system can be connected to each other through any form or medium of digital data communication (for example, a communication network). Example of a communication network includes: local area network (LAN), wide area network (WAN), and the Internet.

The computer system can include a client and a server. The client and server are typically far away from each other and usually interact through a communication network. The relationship between the client and the server is generated through computer programs running on the corresponding computer and having a client-server relationship with each other.

According to the technical solutions of the embodiments of the present disclosure, from the perspective of the perceptions of drivers or passengers, the dynamic safety time headway is redefined based on different travelling scenarios which are easy to cause a driver to "perceive danger"; the target time headway is determined based on the monitored target travelling scenario; furthermore, a vehicle is controlled to adjust the state of the host vehicle dynamically, so as to reach the target time headway, and which can be corrected in time if changes of the target scenario is encountered in this process. It solves the problem: the prior arts pay too much attention to the state of the vehicle ahead to perform the automatic driving control, but ignore the perceptions of the driver or passenger(s) of the host vehicle on the travelling scenario, thereby causing the human intervention by the driver and further affecting the experience of the automatic driving. It avoids the misjudgment and intervention caused by the perceptions of the safety threats by the driver, which cause traffic accidents, for example, rear-endings or collision accidents caused by abrupt acceleration or deceleration upon being cut-in frequently. It improves the user experience and the security trust of the user about the automatic driving.

It should be understood that the various forms of processes shown above can be used to reorder, add or delete steps. For example, the steps described in the present disclosure can be performed in parallel, sequentially, or in a different order, as long as the desired result of the technical solution disclosed in the present disclosure can be achieved, which is not limited herein.

The foregoing specific implementations do not constitute a limitation on the protection scope of the present disclosure. Those skilled in the art should understand that various modifications, combinations, sub-combinations and substitutions can be made according to design requirements and other factors. Any amendments, equivalent substitutions and improvements made within the spirit and principle of the present disclosure shall be included in the scope of protection of the present disclosure.

What is claimed is:

1. A vehicle control method, comprising:
   determining a target travelling scenario according to real-time monitoring data upon fulfilment of a preset update condition;
   determining a target time headway according to the target travelling scenario, wherein the target time headway is used to dynamically adjust a relative motion state between a host vehicle and a surrounding vehicle; and
   controlling the host vehicle according to the target time headway;
   wherein the controlling the host vehicle according to the target time headway comprises:
   determining a transitional time headway using a preset transition model according to a current time headway and the target time headway; and
   performing adaptive cruise control according to the transitional time headway;
   wherein the determining the transitional time headway using the preset transition model according to the current time headway and the target time headway comprises:
   determining a transition coefficient according to the current time headway during a preset time interval;
   determining a change amount of a time headway corresponding to a next adjustment moment according to the transition coefficient and the target time headway; and
   determining the transitional time headway at the next adjustment moment according to the change amount of the time headway and the current time headway;
   wherein the determining the transition coefficient according to the current time headway during the preset time interval comprises:
   determining a change rate of the current time headway according to a recorded time headway during the preset time interval; and
   determining the transition coefficient according to the change rate and the target travelling scenario.

2. The vehicle control method according to claim 1, wherein the fulfilment of the preset update condition comprises:
   determining that a current travelling scenario has changed according to the real-time monitoring data.

3. The vehicle control method according to claim 2, wherein the determining the target time headway according to the target travelling scenario comprises:
   determining a scenario perception coefficient corresponding to the target travelling scenario; and
   determining the target time headway according to the scenario perception coefficient.

4. The vehicle control method according to claim 3, wherein the determining the target time headway according to the scenario perception coefficient comprises:
   determining a base time headway according to a current vehicle speed and a distance to a target vehicle ahead; and
   determining the target time headway according to the base time headway and the scenario perception coefficient.

5. The vehicle control method according to claim 4, wherein the determining the target time headway according to the base time headway and the scenario perception coefficient comprises:
   setting the target time headway to be a product of the scenario perception coefficient and the base time headway.

6. The vehicle control method according to claim 4, wherein the target vehicle ahead comprises: a vehicle in the same lane and a vehicle in an adjacent lane;
   correspondingly, the determining the base time headway according to the current vehicle speed and the distance to the target vehicle ahead comprises:
   determining a first time headway according to a distance between the host vehicle and the vehicle ahead in the same lane;
   determining a second time headway according to a distance between the host vehicle and the vehicle in the adjacent lane; and
   determining the base time headway according to the first time headway and the second time headway.

7. The vehicle control method according to claim 3, wherein the real-time monitoring data comprises a current vehicle speed, and the determining the target travelling scenario according to real-time monitoring data comprises:
   determining a speed type for the target travelling scenario according to the current vehicle speed, and setting the scenario perception coefficient correspondingly, wherein the speed type comprises a high-speed scenario and a low-speed scenario.

8. The vehicle control method according to claim 7, wherein the real-time monitoring data comprises a real-time road condition image, and the determining the target travelling scenario according to real-time monitoring data comprises:

determining that the target travelling scenario is a first characteristic scenario and setting the scenario perception coefficient correspondingly if a number of changes of a vehicle ahead is greater than a preset number of times a first preset number of frames of the real-time road condition image.

9. The vehicle control method according to claim 8, wherein the determining the target travelling scenario according to real-time monitoring data comprises:

determining a vehicle type corresponding to the vehicle ahead according to a second preset number of frames of the real-time road condition image; and determining that the target travelling scenario is a special vehicle scenario and setting the scenario perception coefficient correspondingly if the vehicle type is a special vehicle.

10. The vehicle control method according to claim 9, wherein the real-time monitoring data comprises positioning data and high accuracy map data, and the determining the target travelling scenario according to the real-time monitoring data comprises:

determining a current location scenario type of the host vehicle according to the positioning data and the high accuracy map data, and setting the scenario perception coefficient correspondingly.

11. The vehicle control method according to claim 10, wherein the real-time monitoring data comprises weather data, and the determining the target travelling scenario according to real-time monitoring data comprises:

determining a low-visibility scenario according to the weather data, the positioning data, and the high accuracy map data, and setting the scenario perception coefficient correspondingly.

12. The vehicle control method according to claim 11, wherein the target travelling scenario is a combined scenario combining at least two of the speed type, the special vehicle scenario, the low-visibility scenario and the location scenario, wherein the scenario perception coefficient of the target travelling scenario is a composite scenario perception coefficient determined according to a scenario perception coefficient corresponding to each scenario type in the combined scenario.

13. The vehicle control method according to claim 1, wherein after the determining the target time headway according to the target travelling scenario, the method further comprises:

determining prompt information according to the target travelling scenario, wherein the prompt information is used to prompt a user that the vehicle is entering a vehicle control adjustment state corresponding to the target travelling scenario; and outputting the prompt information.

14. A non-transitory computer-readable storage medium storing thereon computer instructions which are used to cause a computer to carry out the method according to claim 1.

15. An electronic device, comprising:

at least one processor; and a memory, communicatively connected with the at least one processor, wherein:

the memory stores thereon instructions executable by the at least one processor, and when being executed by the at least one processor, the instructions cause the at least one processor to:

determine a target travelling scenario according to real-time monitoring data upon fulfilment of a preset update condition;

determine a target time headway according to the target travelling scenario, wherein the target time headway is used to dynamically adjust a relative motion state between a host vehicle and a surrounding vehicle; and control the host vehicle according to the target time headway;

wherein the at least one processor is further caused to:

determine a transitional time headway using a preset transition model according to the current time headway and the target time headway; and perform adaptive cruise control according to the transitional time headway;

wherein the at least one processor is further caused to:

determine a transition coefficient according to the current time headway during a preset time interval;

determine a change amount of the time headway corresponding to a next adjustment moment according to the transition coefficient and the target time headway; and determine the transitional time headway at the next adjustment moment according to the change amount of the time headway and the current time headway;

wherein the at least one processor is further caused to:

determine a change rate of the current time headway according to a recorded time headway during the preset time interval; and determine the transition coefficient according to the change rate and the target travelling scenario.

16. The electronic device according to claim 15, wherein the fulfilment of the preset update condition comprises:

determining that a current travelling scenario has changed according to the real-time monitoring data.

* * * * *